United States Patent
Lin et al.

(10) Patent No.: US 9,764,908 B2
(45) Date of Patent: Sep. 19, 2017

(54) CONCENTRIC FLOW VARIABLE ORIFICES FOR GAS AND PARTICULATE FLOW BALANCE

(71) Applicant: Babcock Power Services, Inc., Worcester, MA (US)

(72) Inventors: Qingsheng Lin, Holden, MA (US); John A. Sund, Jr., Oakham, MA (US); Craig A. Penterson, Sutton, MA (US)

(73) Assignee: Babcock Power Services, Inc., Worcester, MA (US)

( * ) Notice: Subject to any disclaimer, the term of this patent is extended or adjusted under 35 U.S.C. 154(b) by 0 days.

(21) Appl. No.: 15/214,020

(22) Filed: Jul. 19, 2016

(65) Prior Publication Data
US 2017/0023035 A1    Jan. 26, 2017

Related U.S. Application Data (63) Continuation-in-part of application No. 14/807,250, filed on Jul. 23, 2015.

(60) Provisional application No. 62/199,746, filed on Jul. 31, 2015.

(51) Int. Cl.
  *F15D 1/02*    (2006.01)
  *B65G 53/40*   (2006.01)

(52) U.S. Cl.
  CPC .................... *B65G 53/40* (2013.01)

(58) Field of Classification Search
  USPC ...................................... 138/45, 46
  See application file for complete search history.

(56) References Cited

U.S. PATENT DOCUMENTS

| | | | |
|---|---|---|---|
| 2,649,272 A * | 8/1953 | Barbato | F16K 3/03 138/43 |
| 3,593,629 A | 7/1971 | Rentschler | |
| 4,173,324 A * | 11/1979 | Rudmann | B64G 4/00 244/172.5 |
| 4,513,948 A | 4/1985 | Konig | |
| 5,576,792 A * | 11/1996 | O'Brien | G03B 9/02 355/71 |
| 6,009,899 A | 1/2000 | Polutnik | |
| 7,255,012 B2 | 8/2007 | Hedtke | |
| 7,819,728 B2 * | 10/2010 | Beckley | B60H 1/3407 220/822 |
| 8,215,613 B2 | 7/2012 | Cheung | |
| 8,316,820 B1 | 11/2012 | Cammarata | |

FOREIGN PATENT DOCUMENTS

DE    102012013381 A1    1/2014

* cited by examiner

*Primary Examiner* — James Hook
(74) *Attorney, Agent, or Firm* — Locke Lord LLP; Scott D. Wofsy; Joshua L. Jones

(57) ABSTRACT

A variable orifice assembly includes a housing defining a flow orifice therethrough and configured to be connected in fluid communication between two pipes of a particle conveyance system. The assembly includes a plurality of blades pivotally mounted to the housing to pivot between a retracted position and an extended position. Each blade includes a gas path edge. In the retracted position, the gas path edges of the blades conform to the flow orifice. In the extended position, the blades extend inward from the flow orifice.

16 Claims, 7 Drawing Sheets

CONCENTRIC FLOW VARIABLE ORIFICES FOR GAS AND PARTICULATE FLOW BALANCE

CROSS-REFERENCE TO RELATED APPLICATIONS

This application claims the benefit of priority under 35 U.S.C. §119(e) to U.S. Provisional Application No. 62/199,746, filed Jul. 31, 2015. This application is a continuation-in-part of U.S. patent application Ser. No. 14/807,250 filed Jul. 23, 2015. Both of these applications are incorporated herein by reference in their entireties.

BACKGROUND OF THE INVENTION

1. Field of the Invention

The present disclosure relates to conveyance of mixed flows of particles and gas, and more particularly to variable orifices such as used in coal piping systems.

2. Description of Related Art

A variety of devices and methods are known in the art for conveying flows of gas laden with solid particles. Of such devices, many are directed to coal piping systems, wherein solid particles of pulverized coal are conveyed in an air stream through a piping system such as for delivery to a nozzle for combustion in a furnace. Typical coal piping systems provide multiple parallel pipes between one or more pulverizers and the furnace. It is typically desirable for the air flow in various pipes to be uniformly distributed. For example, downstream of a split where one coal pipe feeds into two or more coal pipes downstream, it is desirable to balance the flow evenly across all of the downstream pipes in order to provide uniform combustion in the furnace. Uniform combustion produces fewer pollutants than non-uniform combustion where local imbalances in the fuel to air ratio lead to inefficient combustion and increased pollutants.

Conventional solutions to the problem of balancing flow among coal pipes have included placing variable orifices in the coal pipes. This allows regulation of pressure between pipes by constricting or obstructing part of the flow passage through the variable orifice in one or more pipes as needed. Typical variable orifice designs are butterfly valve type variable orifices or slide gate valve type variable orifices. While these devices are useful for evening pressure from pipe to pipe, they are limited in their ability to produce uniform distribution. Both butterfly valve and slide gate valve type variable orifices produce an asymmetrical imbalance in the air and particle flow downstream of the variable orifice. In other words, traditional variable orifices produce local non-uniformities in coal particle distribution within individual pipes. Non-uniform distribution of air and particles causes localized erosion of coal pipes which can eventually erode completely if not checked, creating unsafe operations.

Such conventional methods and systems have generally been considered satisfactory for their intended purpose. However, there is still a need in the art for improved variable orifices. The present disclosure provides a solution for this need.

SUMMARY OF THE INVENTION

A variable orifice assembly includes a housing defining a flow orifice therethrough and configured to be connected in fluid communication between two pipes of a particle conveyance system. The assembly includes a plurality of blades pivotally mounted to the housing to pivot between a retracted position and an extended position. Each blade includes a gas path edge. In the retracted position, the gas path edges of the blades conform to the flow orifice. In the extended position, the blades extend inward from the flow orifice wherein the gas path edge of each blade is spaced apart from the other blades.

The housing can include an axially spaced apart pair of housing rings joined together by a plurality of spacers therebetween. The spacers can be circumferentially spaced apart from one another, alternating circumferentially with the blades. The spacers can be mounted to be stationary relative to the housing rings. It is also contemplated that the housing can include an outer ring having a respective access opening proximate each respective blade.

The blades can be pivotally mounted axially between the housing rings, e.g., by a respective pivot pin passing axially through each of the housing rings and the respective blade. The pivot pins can be mounted to remain stationary relative to the housing rings.

The gas path edge of each blade can be curved along a circular arc. For example, the circular arc can have a diameter substantially equal to that of the flow orifice. In the retracted position, the gas path edge of each blade can be substantially flush with the flow orifice.

A limiter can be operatively connected to the blades to limit travel of the blades to prevent the blades meeting or contacting one another within the flow orifice. The limiter can be configured to prevent a free end of each blade opposite a respective pivot point of the blade from reaching, meeting, or crossing a centerline of the orifice passing through the respective pivot point. For example, the blades together can have a maximum extent into the flow orifice in a fully extended position that blocks up to 50% of the flow area of the flow orifice.

Each blade can include a respective actuator operatively connecting the blade to the housing to move the blade independent of the other blades. It is also contemplated that a linkage can operatively connect the blades together for synchronized actuation of the blades.

A particulate piping system includes a first pipe configured for conducting a mixed flow of particulate and gas therethrough in an axial direction and a second pipe configured for conducting a mixed flow of particulate and gas therethrough in the axial direction. The system also includes a variable orifice assembly as described above, wherein the housing is mounted to connect the first and second pipes for fluid communication from the first pipe to the second pipe.

The first and second pipes can each have an inner diameter that is equal to the diameter of the flow orifice of the variable orifice assembly. Each of the first and second pipes can be mounted, e.g., welded or bolted, to a respective housing ring of the housing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
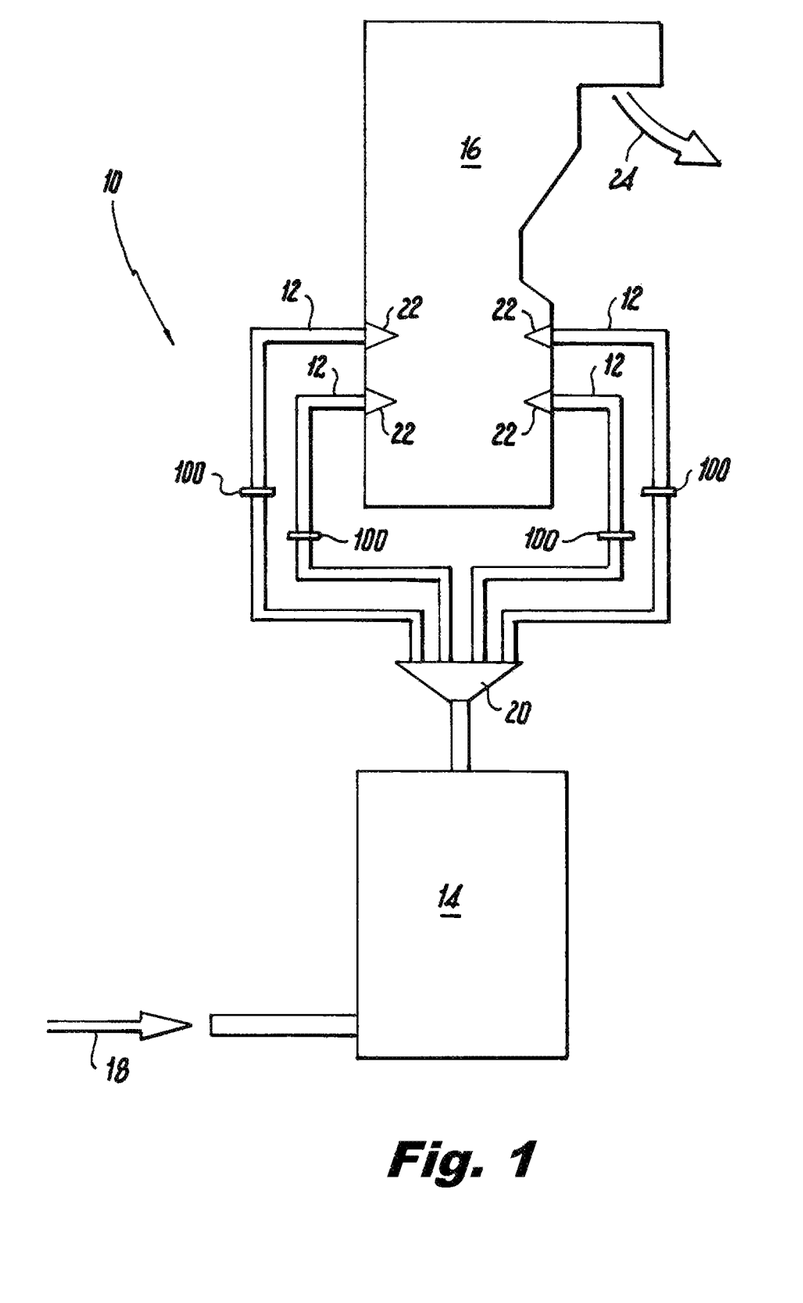
FIG. 1 is a schematic view of an exemplary embodiment of a particulate piping system constructed in accordance with the present disclosure, showing four coal pipes, each having a variable orifice assembly.

Reference will now be made to the drawings wherein like reference numerals identify similar structural features or aspects of the subject disclosure. For purposes of explanation and illustration, and not limitation, a partial view of an exemplary embodiment of a variable orifice assembly in accordance with the disclosure is shown in FIG. 1 and is designated generally by reference character 100. Other embodiments of variable orifice assemblies in accordance with the disclosure, or aspects thereof, are provided in FIGS. 2-13, as will be described. The systems and methods described herein can be used to provide even pressure and flow distribution among multiple pipes in particulate distribution systems such as coal piping systems.

As shown in FIG. 1, particulate piping system 10 provides fluid communication for conveyance of pulverized particles, such as coal, through four pipes 12 connecting between a pulverizer 14 and a furnace 16. In this example, coal and air are introduced to pulverizer, as indicated by arrow 18. After comminution in pulverizer 14, pulverized coal particulate is entrained in an air flow passing from pulverizer 14 to a divider 20, which divides the flow among the four coal pipes 12, wherein the number of pipes here is given by way of example. Each pipe 12 terminates at a respective nozzle 22 inside furnace 16, where coal and air are combusted and the exhaust exits as indicated by arrow 24. In order to ensure even pressure and flow among the four pipes 12 for efficient combustion, each pipe 12 includes a respective variable orifice assembly 100. Each variable orifice assembly 100 is also configured to promote even distribution of particles and air flow within its respective pipe.

Figure 2:
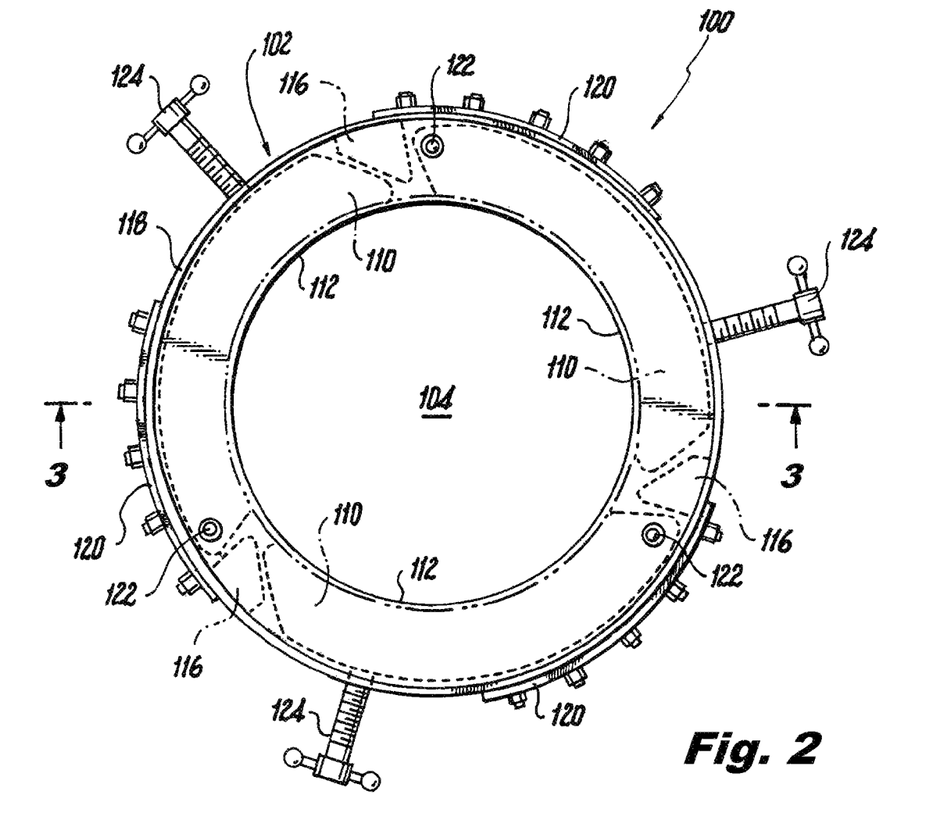
FIG. 2 is an axial end view of one of the variable orifice assemblies of FIG. 1, showing the blades in the retracted position.
Figure 3:
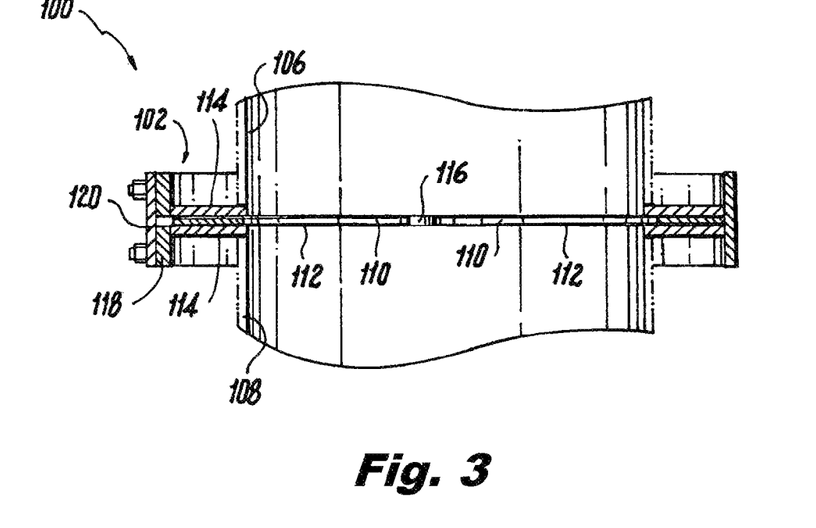
FIG. 3 is a cross-sectional side elevation view of the variable orifice assembly of FIG. 2, showing the blades between the two housing rings.

Referring now to FIG. 2, each variable orifice assembly 100 includes a housing 102 defining a flow orifice 104. Housing 102 is connected in fluid communication between two pipes, e.g., pipes 106 and 108, which are upstream and downstream portions of pipe 12, respectively, as shown in FIG. 3. Pipes 106 and 108 are configured for conducting a mixed flow of particulate and gas therethrough in the axial direction. The first and second pipes 106 and 108 each have an inner diameter that is equal or substantially equal to the diameter of the flow orifice 104 of the variable orifice assembly 100. Each of the first and second pipes 106 and 108 can be mounted, e.g., welded or bolted with a flange, to a respective housing ring of the housing.

Figure 4:
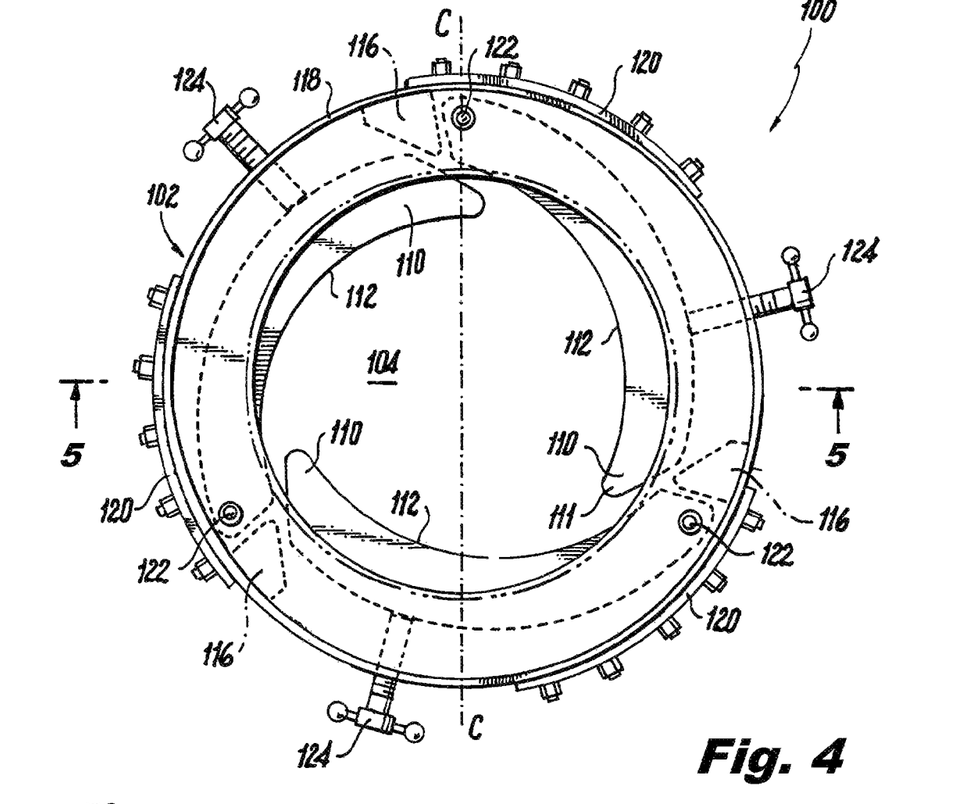
FIG. 4 is an axial end view of the variable orifice assembly of FIG. 2, showing the blades in the extended position.

Assembly 100 includes a plurality of blades 110, each pivotally mounted to housing 102 to pivot between a retracted position, as shown in FIG. 2, and an extended position, as shown in FIG. 4. The configuration with three blades 110, as depicted in FIGS. 2-5, is given by way of example, as those skilled in the art will readily appreciate that any suitable number of blades can be included without departing from the scope of this disclosure. Each blade 110 includes a gas path edge 112.

In the retracted position shown in FIGS. 2 and 3, gas path edges 112 of blades 110 conform to the flow orifice 104 of housing 102. The gas path edge 112 of each blade 110 is curved along a circular arc with a diameter substantially equal to that of the flow orifice 104. In the retracted position, the gas path edge 112 of each blade 110 is substantially flush with the flow orifice 104. In the extended position, shown in FIGS. 4 and 5, the blades 110 extend radially inward from the flow orifice 104 of housing 102. The gas path edge 112 of each blade 110 is spaced apart from the other blades 110 in the extended position, so the blades 110 do not abut or overlap each other.

Figure 5:
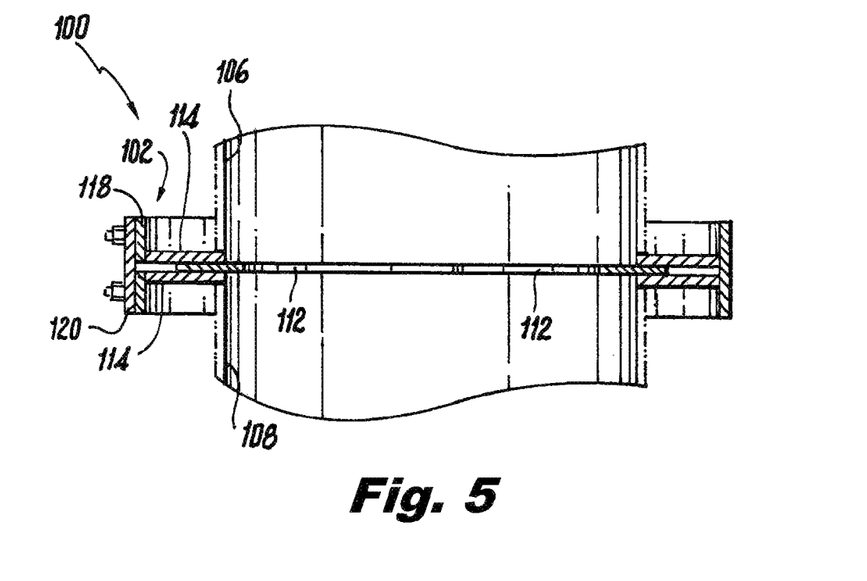
FIG. 5 is a cross-sectional side elevation view of the variable orifice assembly of FIG. 4, showing the blades in the extended position.

The housing 102 can include an axially spaced apart pair of housing rings 114, identified in FIGS. 3 and 5, joined together by a plurality of spacers 116 therebetween. In this example, there are three spacers 116, one for each blade 110. Spacers 116 are circumferentially spaced apart from one another, alternating circumferentially with the blades 110. Spacers 116 are mounted to be stationary relative to housing rings 114.

Blades 110 are pivotally mounted axially between the housing rings 114, each by a respective pivot pin 122 passing axially through each of the housing rings 114 and the respective blade 110. Pivot pins 122 are mounted to remain stationary relative to the housing rings 114, i.e. the pivot axes of pins 122 are stationary even if pins 122 rotate around said axes.

Housing 102 also includes an outer ring 118 having a respective access opening, shown covered by access covers 120 in FIGS. 2 and 4, proximate the pin 122 about which each respective blade 110 pivots. This allows access for maintenance, for example, to remove accumulated fines from behind blades 110, and for replacing blades 110 if worn or damaged, for example.

Each blade 110 includes a respective actuator 124 operatively connecting the respective blade 110 to housing 102 to move the blade 110 independent of the other blades 110. Each actuator 124 has a threaded engagement with outer ring 118 and a swivel engagement with the respective blade 110. This configuration allows for individual adjustment to the position of each blade 110, which can be beneficial in applications where it is desirable to compensate for asymmetries in particle distribution within a given pipe 12. The position of any given blade 110 is indicated by the extent to which the actuator 124 protrudes from outer ring 118.

Optionally, actuators 124 could be directly connected to pins 122 to rotate pins 122, which if rigidly connected to blades 110 would in turn rotate the blades 110.

Figure 6:
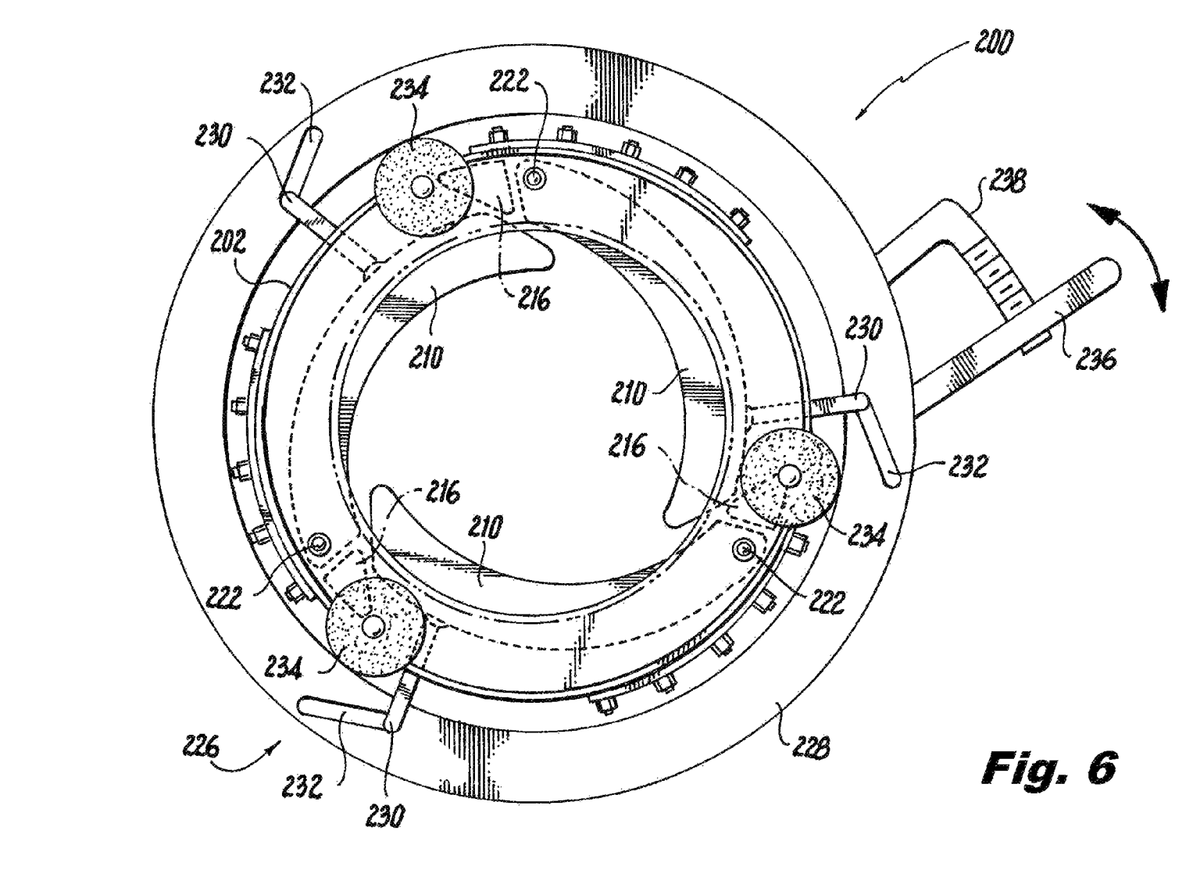
FIG. 6 is an axial end view of another exemplary embodiment of a variable orifice assembly constructed in accordance with the present disclosure, showing a linkage mechanism for synchronizing blade actuation.
Figures 7, 8:
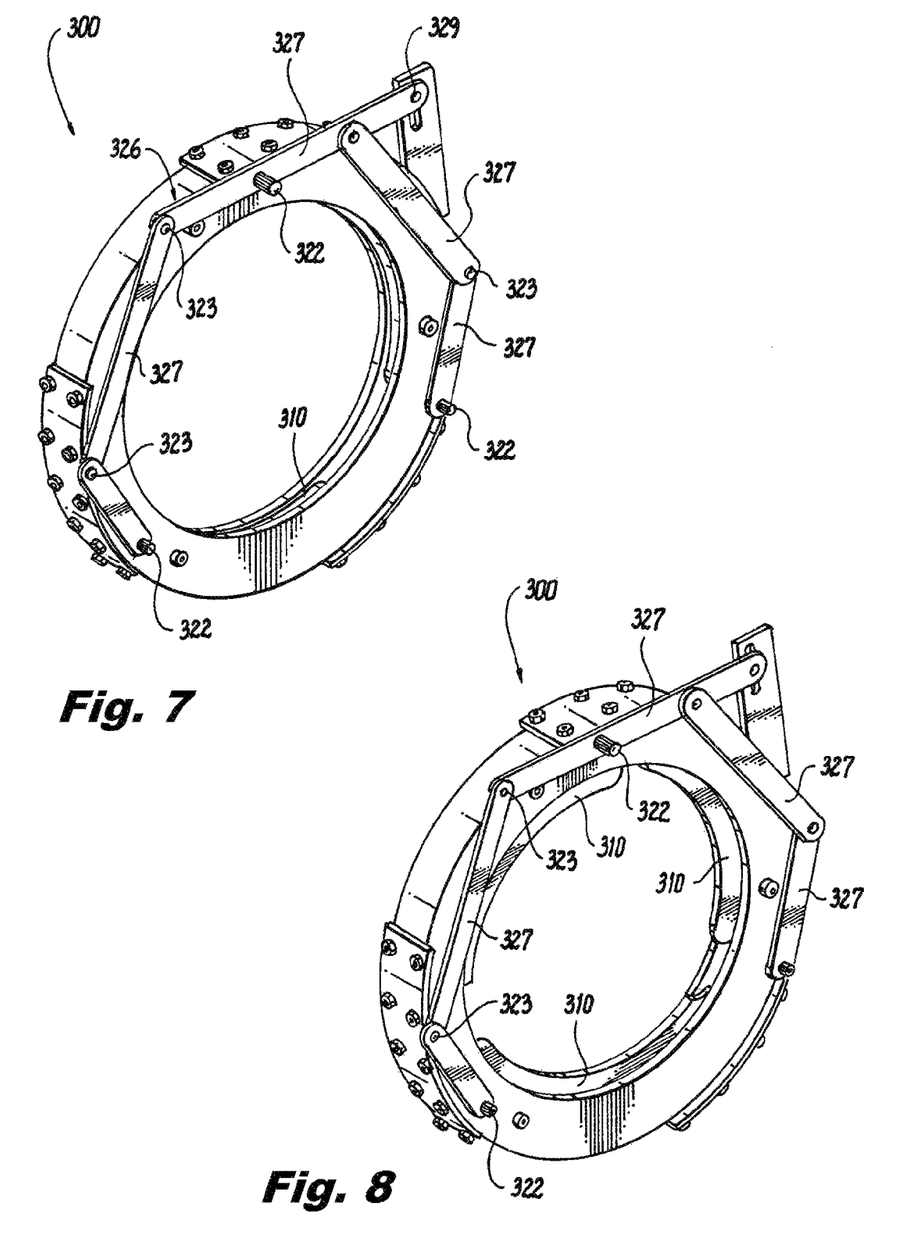
FIGS. 7-10 are perspective views of another exemplary embodiment of a variable orifice assembly constructed in accordance with the present disclosure, showing another exemplary linkage mechanism for synchronizing blade auction, showing the blades in four different positions, respectively, from fully retracted to extended.
Figure 9:
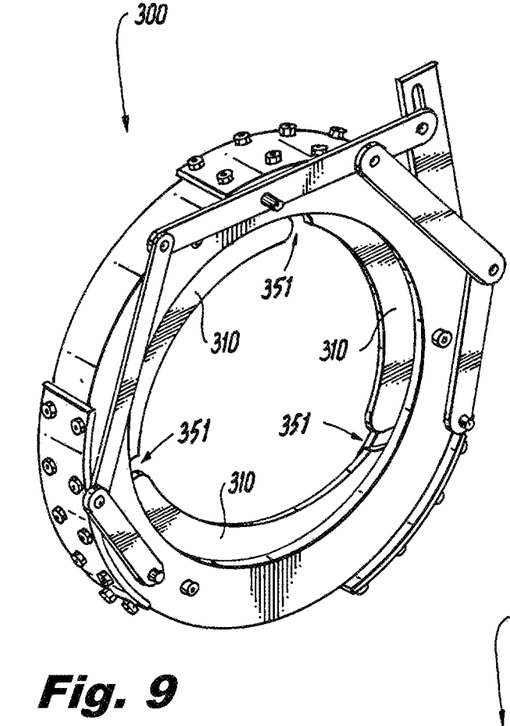
Figure 10:
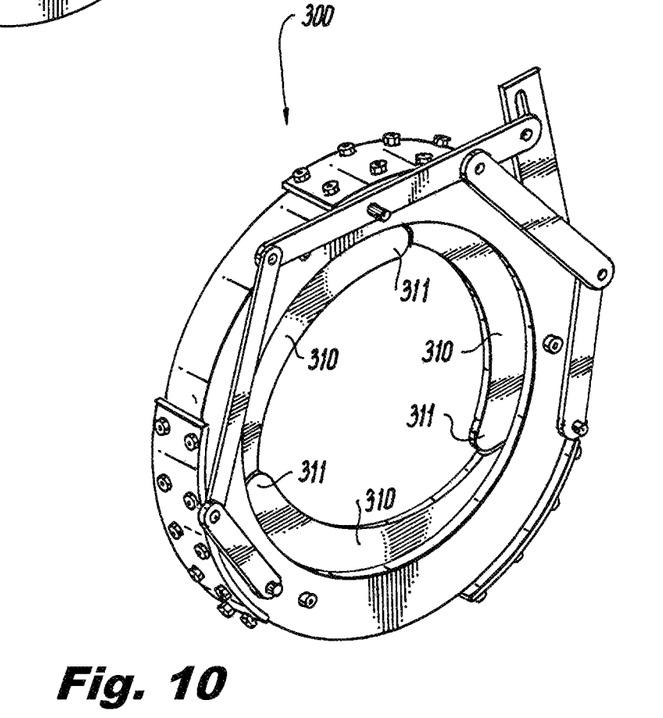

With reference now to FIG. 6, it is also contemplated that a linkage can operatively connect the blades together for synchronized actuation of the blades. Assembly 200 includes a housing 202, blades 210, pins 222, and spacers 216 essentially as described above, with a linkage 226 for synchronizing the position of blades 210. Linkage 226 includes a synchronization ring 228 connected to each respective blade 210 by way of a respective push rod 230. Each push rod 230 is pivotally connected to the respective blade 210, and is in sliding engagement with a respective cam slot 232 defined in synchronization ring 228. Synchronization ring 228 is rotatably engaged to a pipe 12, not shown in FIG. 6, but see FIG. 1, for example by gears or rollers 234 proximate assembly 200. A lever 236, affixed to one of gears or rollers 234, can be actuated in the direction indicated by the double arrow in FIG. 6 to roll synchronization ring 228 on gears or rollers 234, sliding pushrods 230 along cam slots 232 to retract or extend blades 210. An indicator 238 mounted stationary relative to housing 202 can be used to determine the position of blades 210. The actuators described herein are given by way of example, and those skilled in the art will readily appreciate that any other suitable type of actuator, manual or mechanized, can be used without departing from the scope of this disclosure.

A limiter, e.g., the actuators described herein, spacers 116, or any other suitable type of limiter, can be operatively connected to the blades to limit travel of the blades, e.g., blades 110 and 210, to prevent the blades meeting or contacting one another within the flow orifice, e.g. orifice 104. The limiter can be configured to prevent a free end of each blade opposite a respective pivot point, e.g. pins 122, of the blade from reaching, meeting, or crossing a centerline of the orifice passing through the respective pivot point. For example, in FIGS. 2 and 4, the end 111 of blade 110 extending from the pin 122 at the top of housing 102 as oriented in FIGS. 2 and 4 cannot extend beyond the vertical centerline C extending through said pin 122. For example, the blades together can have a maximum extent into the flow orifice in the fully extended position that blocks up to 50% of the flow area of the flow orifice, e.g., with the back edges of the blades 110 just within the housing rings 114.

With reference now to FIGS. 7-10, another exemplary assembly 300 is shown much as described above with respect to assembly 200, with another exemplary version of a linkage system 326. Linkage 326 includes links that pivot pins 322, which in turn drive blades 310 much as described above. Links 327 of linkage 326 are connected end to end at pivot joints 323 for synchronization of blade movement. An extension 329 of one of the links 327 can be used to drive linkage 326, e.g., manually, or with a mechanical, electrical, hydraulic, pneumatic, or similar type of actuator. Divots 351 in the portion of each blade 310 proximate its respective pin 322, are shaped to accommodate the respective tip ends 311 of an adjacent blade in the fully extended position shown in FIG. 10.

Figure 11:
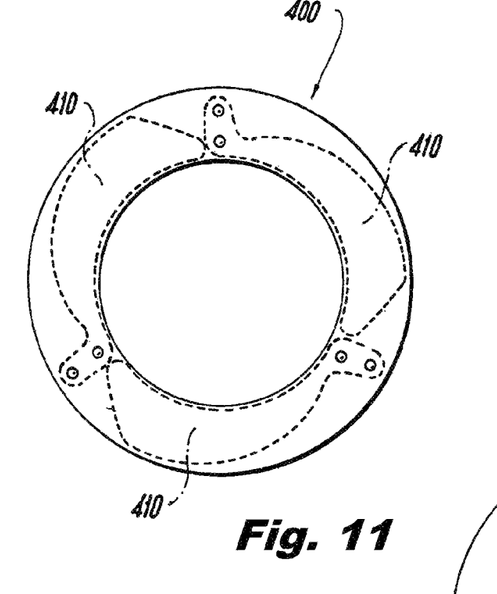
FIGS. 11-13 are end elevation views of another exemplary embodiment of a variable orifice assembly constructed in accordance with the present disclosure, showing blades that can overlap in the extended position, wherein the blades are shown in three respective states from retracted to extended.
Figure 12:
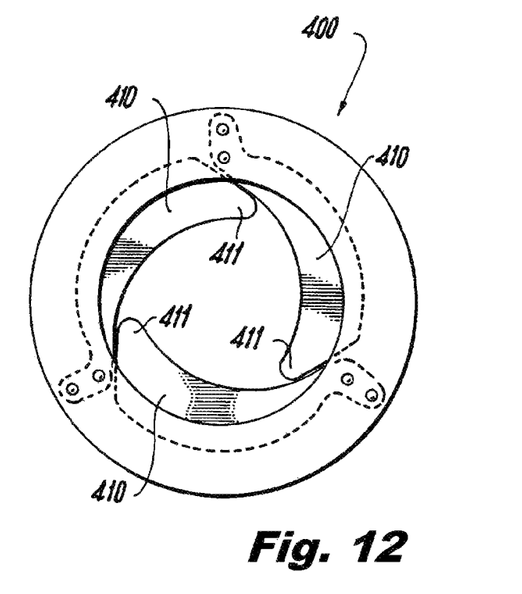
Figure 13:
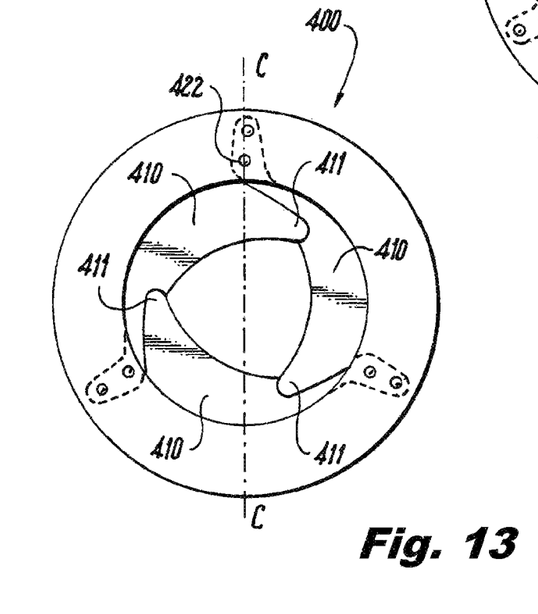

With reference now to FIGS. 11-12, while embodiments above contemplate having the blades on a single layer of the respective assemblies, as shown in FIG. 3, this can limit the travel of the blades, when blades in a common layer abut one another in the extended position for example. In assembly 400, blades 410 are constructed on multiple levels so that in the extended position shown in FIG. 13, it is possible for the ends 411 of the blades to overlap their adjacent neighboring blades 410. It can be noted in FIG. 4 that even in the overlapping position, the end 411 of each blade 410 does not need to extend beyond the centerline, e.g., centerline C, passing through its respective pin 422.

Variable orifice devices are important, for example, for pulverizer systems to balance primary air flow distributed between burner lines. Conventional devices can be installed on each individual burner line, where the variable orifices control burner line pressure drop on-line to change the air flow through each burner line. The conventional variable orifice designs, such as butterfly valve type or slide gate valve type, create a biasing coal flow or deflects coal particles against the coal pipe wall when balancing air flow. This non-concentric air and coal produces premature wear on the coal pipe downstream of the orifice and causes air and coal flow stratification as well.

Devices as disclosed herein apply the principle similar to camera aperture concept using multiple blades to truly achieve a variable orifice. The aperture configuration produces a concentric coal and air flow through the variable orifice and thus provides uniform flow pattern downstream to eliminate the premature wear of the coal pipe. Associated with suitable primary air sources, devices as described herein are capable of controlling primary air flow distribution within the range, for example, of 3% to 8% deviation. The devices disclosed herein combined with suitable pulverized fuel distributors and/or variable coal riffles can be an ultimate solution for balancing coal and air flow distribution between coal pipes to meet low NOx burner performance requirements for combustion and emission reduction.

Potential advantages of devices disclosed herein over traditional devices include: true orifice design producing concentric air and coal flow pattern, reduced or eliminated impact on coal pipe wear life, reduced or eliminated air and coal flow stratification, easier and more reliable online adjustment, valve plates (e.g. blades) made with wear resistant material and replaceable, slim design for reduced/minimum installation space requirement, and customizable design to connect with existing coal pipes.

Since the obstruction provided by the blades can be generally axisymmetric, the particle distribution within a given pipe is considerably improved over traditional variable orifices. Not only do the systems and methods described herein provide for evening out pressure among multiple pipes, they additionally can potentially improve particle flow distribution within the individual pipes.

The methods and systems of the present disclosure, as described above and shown in the drawings, provide for variable orifice assemblies with superior properties including improved particle distribution within individual pipes compared to traditional variable orifices. The methods and systems of the present disclosure provide a tool that creates pressure drop without distorting the particle/air mixture, and can prevent a distorted coal/air mixture profile from eroding the coal piping immediately downstream of the variable orifice, for example.

Compared with traditional variable orifice designs, the methods and systems of this disclosure can maintain concentric coal and air flow for any suitable piping system required to achieve air flow balance between pipes. This feature can reduce or eliminate the problems that typically result from traditional airflow balance devices, such as premature wear on the coal pipe downstream of the balance device and solid particle or airflow stratification when passing through the device. In traditional systems, to prevent premature wear, ceramic lining was required for the coal pipes downstream of the traditional devices, the cost of which can be eliminated with the systems and method disclosed herein.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A variable orifice assembly comprising:
a housing defining a flow orifice therethrough and configured to be connected in fluid communication between two pipes of a particle conveyance system; and
a plurality of blades pivotally mounted to the housing to pivot between a retracted position and an extended position, each blade including a gas path edge, wherein in the retracted position the gas path edges of the blades conform to the flow orifice, and in the extended position, the blades extend inward from the flow orifice, wherein the housing includes an axially spaced apart pair of housing rings joined together by a plurality of spacers therebetween, wherein each spacer includes a respective limiter operatively connected to the blades to limit travel of the blades to prevent the blades meeting or contacting one another within the flow orifice, wherein each respective limiter is configured to prevent a free end of a respective one of the blades opposite a respective pivot point of the blade from reaching, meeting, or crossing a centerline of the orifice passing through the respective pivot point, wherein each blade contacts a respective limiter in the extended position.

2. An assembly as recited in claim 1, wherein the spacers are circumferentially spaced apart from one another, alternating circumferentially with the blades.

3. An assembly as recited in claim 1, wherein the blades are pivotally mounted axially between the housing rings.

4. An assembly as recited in claim 3, wherein each blade is pivotally mounted axially between the housing rings by a respective pivot pin passing axially through each of the housing rings and the respective blade.

5. An assembly as recited in claim 4, wherein the pivot pins are mounted to remain stationary relative to the housing rings.

6. An assembly as recited in claim 1, wherein the spacers are mounted to be stationary relative to the housing rings.

7. An assembly as recited in claim 1, wherein the gas path edge of each blade is curved along a circular arc.

8. An assembly as recited in claim 7, wherein the circular arc has a diameter substantially equal to that of the flow orifice.

9. An assembly as recited in claim 8, wherein in the retracted position, the gas path edge of each blade is substantially flush with the flow orifice.

10. An assembly as recited in claim 1, wherein each blade includes a respective actuator operatively connecting the blade to the housing to move the blade independent of the other blades.

11. An assembly as recited in claim 1, further comprising a linkage operatively connecting the blades together for synchronized actuation of the blades.

12. An assembly as recite in claim 1, wherein the housing includes an outer ring having a respective access opening proximate each respective blade.

13. An assembly as recited in claim 1, wherein the blades together have a maximum extent into the flow orifice in the fully extended position that blocks up to 50% of the flow area of the flow orifice.

14. A particulate piping system comprising:
a first pipe configured for conducting a mixed flow of particulate and gas therethrough in an axial direction;
a second pipe configured for conducting a mixed flow of particulate and gas therethrough in the axial direction; and
a variable orifice assembly including:
a housing mounted to connect the first and second pipes for fluid communication from the first pipe to the second pipe, the housing defining a flow orifice therethrough; and
a plurality of blades pivotally mounted to the housing to pivot between a retracted position and an extended position, each blade including a gas path edge, wherein in the retracted position the gas path edges of the blades conform to the flow orifice, and in the extended position, the blades extend inward from the flow orifice, wherein the housing includes an axially spaced apart pair of housing rings joined together by a plurality of spacers therebetween, wherein each spacer includes a respective limiter operatively connected to the blades to limit travel of the blades to prevent the blades meeting or contacting one another within the flow orifice, wherein each respective limiter is configured to prevent a free end of a respective one of the blades opposite a respective pivot point of the blade from reaching, meeting, or crossing a centerline of the orifice passing through the respective pivot point, wherein each blade contacts a respective limiter in the extended position.

15. A system as recited in claim 14, wherein the first and second pipes each have an inner diameter that is equal to the diameter of the flow orifice of the variable orifice assembly.

16. A system as recited in claim 14, wherein each housing ring is welded to a respective one of the first and second pipes.

* * * * *